(12) United States Patent
Saito

(10) Patent No.: US 8,325,365 B2
(45) Date of Patent: Dec. 4, 2012

(54) IMAGE FORMING SYSTEM, IMAGE FORMING METHOD AND IMAGE FORMING APPARATUS

(75) Inventor: Takuma Saito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 873 days.

(21) Appl. No.: 12/412,056

(22) Filed: Mar. 26, 2009

(65) Prior Publication Data

US 2009/0316191 A1 Dec. 24, 2009

(30) Foreign Application Priority Data

Jun. 19, 2008 (JP) ................. 2008-160797

(51) Int. Cl.
*G06F 3/12* (2006.01)
*G06F 3/00* (2006.01)
*G06K 15/00* (2006.01)

(52) U.S. Cl. ............... 358/1.15; 358/1.12; 715/513

(58) Field of Classification Search .......... 358/1.12, 358/1.15; 715/513
See application file for complete search history.

(56) References Cited

U.S. PATENT DOCUMENTS

| | | | |
|---|---|---|---|
| 6,362,894 B1 * | 3/2002 | Shima ................. | 358/1.15 |
| 2004/0105127 A1 | 6/2004 | Cudd et al. | |
| 2004/0109190 A1 | 6/2004 | Nagai | |
| 2005/0169685 A1 | 8/2005 | Matsubayashi et al. | |
| 2005/0286063 A1 | 12/2005 | Owen et al. | |
| 2007/0101262 A1 | 5/2007 | Suzuki et al. | |
| 2008/0055613 A1 | 3/2008 | Hatfield | |

FOREIGN PATENT DOCUMENTS

| | | |
|---|---|---|
| JP | 11-203100 | 7/1999 |
| JP | 2000-132006 | 5/2000 |
| JP | 2000-276311 | 10/2000 |
| JP | 2001-282481 A | 10/2001 |
| JP | 2002-057968 | 2/2002 |
| JP | 2002-273943 | 9/2002 |
| JP | 2002-278727 | 9/2002 |
| JP | 2003-122770 A | 4/2003 |
| JP | 2004-070601 | 3/2004 |
| JP | 2004-175020 | 6/2004 |
| JP | 2004-181787 | 7/2004 |
| JP | 2005-251175 | 9/2005 |

(Continued)

OTHER PUBLICATIONS

Notification of Reasons for Refusal for corresponding Japanese Application No. 2008-160797 mailed on Apr. 20, 2010.

(Continued)

*Primary Examiner* — Charlotte M Baker
*Assistant Examiner* — Justin Katzwhite
(74) *Attorney, Agent, or Firm* — Banner & Witcoff, Ltd.

(57) ABSTRACT

An image forming system includes an information processing apparatus, an image forming apparatus that is connected to the information processing apparatus so as to communicate with each other, a splitting unit that splits a page to be printed into a plurality of areas according to a preset splitting rule, a setting unit that respectively sets a print condition, which affects a usage amount of a color material used for printing, for each of the plurality of areas, and a printing unit that prints the page to be printed based on the print condition set to each of the plurality of areas.

19 Claims, 16 Drawing Sheets

FOREIGN PATENT DOCUMENTS

| | | |
|---|---|---|
| JP | 2006-031476 A | 2/2006 |
| JP | 2006-033669 | 2/2006 |
| JP | 2007-122618 | 5/2007 |

OTHER PUBLICATIONS

JP Office Action dtd Nov. 11, 2010, JP Appln. No. 2008-160797, English translation.

CN Office Action dtd Dec. 21, 2010, CN Appln. No. 200910133028.1, English translation.

CN Office Action dtd Jul. 6, 2011, CN Appln. 200910133028.1, English translation.

EP Extended Search Report mailed Mar. 7, 2012, EP Appln. 09004268.0.

Partial EP Search Report dated Oct. 19, 2011, corresponding Application No. 09004268.0.

CN Decision on Rejection dated Oct. 26, 2011, corresponding Application No. 200910133028.1; English Translation.

* cited by examiner

IMAGE FORMING SYSTEM, IMAGE FORMING METHOD AND IMAGE FORMING APPARATUS

CROSS-REFERENCE TO RELATED APPLICATIONS

This application claims priority from Japanese Patent Application No. 2008-160797 filed on Jun. 19, 2008, the entire subject matter of which is incorporated herein by reference.

TECHNICAL FIELD

Aspects of the invention relate to an image forming system, an image forming method, a print program, and an image forming apparatus.

BACKGROUND

There has been proposed a related art information processing apparatus for printing image information by adding an advertisement to the image information. For example, JP-A-2004-070601 discloses an information processing apparatus, in which a user is able to select whether or not to print image information by adding an advertisement to the image information. The advertisement is added to and is printed with the image information when the user selects to print by adding the advertisement.

SUMMARY

In the above-described related art information processing apparatus, the user is able to select whether or not to add the advertisement to the image information. However, for example, when the user executes a Web browser to browse a Web page at a Web side on a World Wide Web (WWW) by using a personal computer, since some Web pages contain advertisements, there may be a case where a Web page is displayed with the advertisements regardless of whether the user desires or not.

In this case, when the user prints such a Web page containing the advertisements, the advertisements that were not intended by the user may also be printed. When the Web page is printed in a state where a high image quality or a color image is set for print conditions, color materials such as toner or ink may be wasted due to the advertisements contained in the Web page.

Therefore, illustrative aspects of the invention provide an image forming system, an image forming method, a print program, and an image forming apparatus, capable of reducing waste of color materials at the time of printing a page to be printed.

According to one aspect of the invention, there is provided an image forming system comprising: an information processing apparatus; an image forming apparatus that is connected to the information processing apparatus so as to communicate with each other; a splitting unit that splits a page to be printed into a plurality of areas according to a preset splitting rule; a setting unit that respectively sets a print condition, which affects a usage amount of a color material used for printing, for each of the plurality of areas; and a printing unit that prints the page to be printed based on the print condition set to each of the plurality of areas.

According thereto, it is possible to reduce waste of color materials at the time of printing a page to be printed by respectively setting a print condition to each of the plurality of areas.

According to another aspect of the invention, there is provided an image forming method comprising: splitting a page to be printed into a plurality of areas according to a preset splitting rule; respectively setting a print condition, which affects a usage amount of a color material used for printing, for each of the plurality of areas; and printing the page to be printed based on the print condition set to each of the plurality of areas.

According thereto, it is possible to reduce the waste of color materials at the time of printing a page to be printed by respectively setting a print condition to each of the plurality of areas.

According to still another aspect of the invention, there is provided an image forming apparatus comprising: a receiving unit that receives print data generated based on a page to be printed in which a plurality of areas are split and a print condition is respectively set to each of the plurality of areas; and an image forming unit that prints the page to be printed based on print data.

According thereto, by printing a page to be printed based on the print data generated based on a page to be printed in which a plurality of areas are split and a print condition is respectively set to each area, the waste of color materials at the time of printing the page to be printed can be reduced.

According to still another aspect of the invention, there is provided an image forming apparatus comprising: a receiving unit that receives print data for respectively setting a print condition to each area of a page to be printed so as to carry out printing; a setting unit that respectively sets a print condition, which affects a usage amount of a color material used for printing, for the each area of the page to be printed; and an image forming unit that prints the page to be printed based on the print condition.

According thereto, by respectively setting a print condition to each area in an image forming apparatus, it is possible to reduce the waste of color materials at the time of printing the page to be printed.

According to still another aspect of the invention, there is provided a computer-readable medium having a print program stored thereon and readable by a computer connected to an image forming apparatus, the print program, when executed by the computer, causes the computer to perform operations comprising: splitting a page to be printed into a plurality of areas according to a preset splitting rule; respectively setting a print condition, which affects a usage amount of a color material used for printing, for each of the plurality of areas; generating print data that is used for printing the page to be printed based on the print condition set to each of the plurality of areas; and transmitting the print data to the image forming apparatus.

According thereto, it is possible to reduce the waste of color materials at the time of printing a page to be printed by the image forming apparatus.

According to still another aspect of the invention, there is provided a computer-readable medium having a print program stored thereon and readable by a computer connected to an image forming apparatus, the print program, when executed by the computer, causes the computer to perform operations comprising: splitting a page to be printed into a plurality of areas according to a preset splitting rule; and transmitting print data for individually setting a print condition to each of the areas for printing, to the image forming apparatus.

According thereto, by individually setting a print condition to each area in an image forming apparatus, the waste of color materials at the time of printing the page to be printed can be reduced.

According to the aspects of the invention, it is possible to reduce the waste of color materials at the time of printing a page to be printed.

DETAILED DESCRIPTION

Exemplary embodiments of the invention will now be described with reference to the drawings.

First Exemplary Embodiment

A first exemplary embodiment of the invention will be described with reference to FIG. 1 to FIG. 9.

(1) Image Forming System

Figure 1:
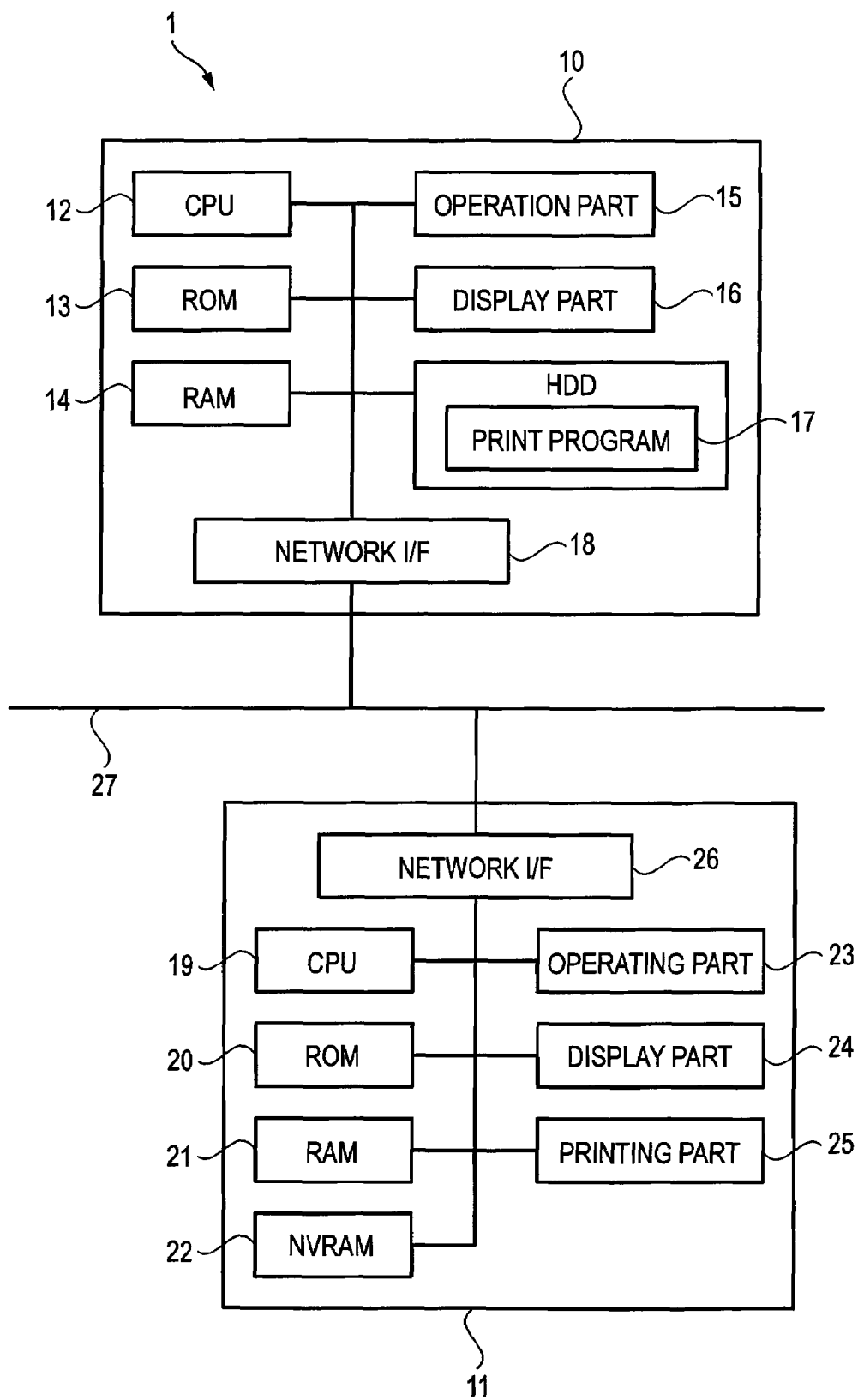
FIG. 1 shows a block diagram of an image forming system according to a first exemplary embodiment of the invention.

FIG. 1 is a block diagram showing an electrical configuration of an image forming system 1 according to the first exemplary embodiment of the invention. An image forming system 1 includes a printer 11 (one example of an image forming apparatus), and one or a plurality of computers 10 (one example of an information processing apparatus) connected to the printer 11 via a communication line 27 such as LAN or Internet. Incidentally, the printer 11 may be directly connected to the computer 10 using a communication cable such as a USB cable. Alternatively, the printer 11 may be wirelessly connected to the computer 10 by using a wireless network.

The computer 10 is a so-called personal computer. The computer 10 includes a CPU 12, a ROM 13, a RAM 14, an operating part 15 (one example of a setting unit, a designating unit, manual a setting unit, and a selecting unit), a display part 16 (one example of a setting unit, a designating unit, a manual setting unit, and a selecting unit), a hard disk (HDD) 17, and a network interface 18 (one example of a transmitting unit). The operating unit 15 includes a keyboard, a mouse, etc. The display unit 16 includes a liquid crystal display, etc. The network interface 18 is connected to the communication line 27, for example.

The CPU 12 (one example of a splitting unit, a setting unit, a printing unit, a designating unit, a manual setting unit, a selecting unit, a generating unit, and a transmitting unit) executes various programs stored in the ROM 13 and on the HDD 17 so as to control each part of the computer 10.

The HDD 17 stores various programs such as a Web browser for browsing a Web page downloaded from a Web side on the World Wide Web via the communication line 27, an electronic mail client program, application programs such as a word processor for creating a document, a printer driver (one example of a print program) for printing a page to be printed by the printer 11.

The printer 11 includes a CPU 19, a ROM 20, a RAM 21, a Non-Volatile Memory (NVRAM) 22, an operating part 23 (one example of a setting unit), a display unit 24 (one example of a setting unit), a printing part 25 (one example of a printing unit and an image forming unit), and a network interface 26 (one example of a receiving unit). The operating unit 23 includes a plurality of buttons, etc. The display unit 24 includes a liquid crystal display, a lamp, etc. The network interface 26 is connected to the communication line 27, for example.

The CPU 19 (one example of a setting unit, a printing unit, an image forming unit, and a receiving unit) executes various programs stored in the ROM 20 so as to control each part of the printer 11.

The printing part 25 forms an image on a recording medium by a laser method, in which toner is used as a color material, or by an ink jet method, in which ink is used as a color material. In the exemplary embodiments of the invention, a laser printer that uses the toner as the color material will be explained.

(2) Printer Driver

Figure 2:
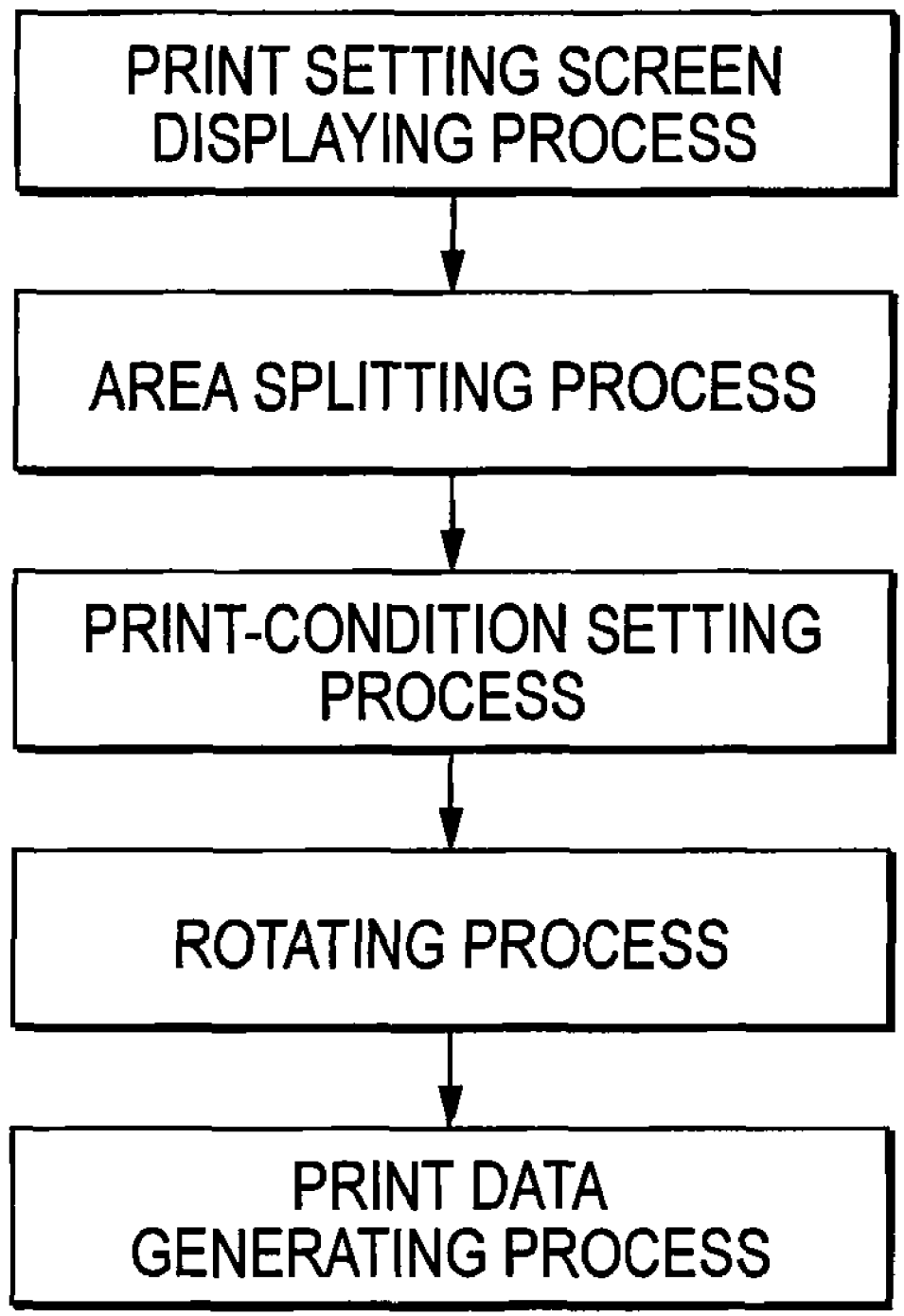
FIG. 2 is a pattern diagram showing a process of an information processing apparatus according to the first exemplary embodiment of the invention.

FIG. 2 is a pattern diagram showing a process executed by the computer 10 for executing a printer driver as a print program. The printer driver is called if print is instructed from an application program. The computer 10 executes the printer driver so as to execute processes such as a print setting screen displaying process, an area splitting process, a print-condition setting process, a rotating process, and a print data generating process. Each process will be described below.

(2-1) Print Setting Screen Displaying Process

The print setting screen displaying process is a process for displaying a print setting screen (not shown) for setting various print conditions. Print conditions, which are applied to a middle-level area (see FIG. 3) (which will be described later), and which are applied to an entire page to be printed such as the number of sets to be printed and the size of the recording medium, are set through the print setting screen.

(2-2) Area Splitting Process

The area splitting process is a process in which the page to be printed is acquired from the application program that instructed the printing, and the acquired page to be printed is split into a plurality of areas according to a previously set splitting rule (one example of a preset splitting rule). An example of the splitting rule will be described below.

Figure 3:
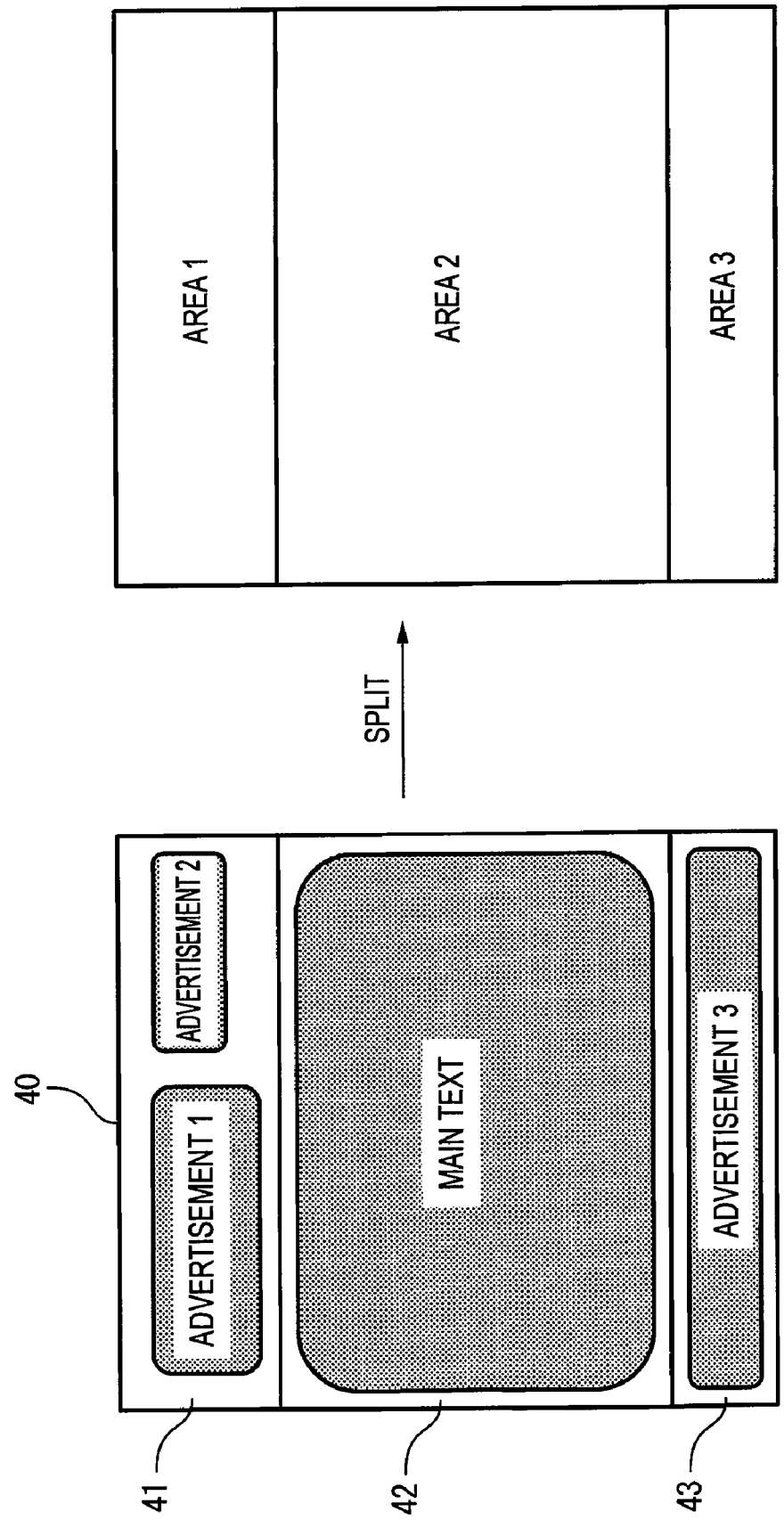
FIG. 3 is a pattern diagram showing an example of a splitting rule according to the first exemplary embodiment of the invention.

FIG. 3 is a pattern diagram showing an example of the splitting rule. A page to be printed 40 illustrated as an example is a Web page, and has a structure in which different Web pages are respectively displayed in a plurality of frame areas 41, 42, and 43 split by a frame.

When the Web site is browsed, there is a case where a main text is displayed in the middle-level frame area 42 as illustrated, for example, and the advertisements by way of a picture, illustration, etc., are displayed in the upper-level frame area 41 and the lower frame area 43. The advertisements displayed in the upper-level frame area 41 and the lower frame area 43 may not necessarily be important for the user. If the printing of such a Web page is carried out by setting a print condition under which a usage amount of toner is small for the upper-level frame area 41 and the lower-level frame area 43, the waste of toner can be reduced.

Therefore, in the first exemplary embodiment, if the page to be printed is split into a plurality of frame areas, each frame area is split as one independent area so that the print conditions can be set individually for each frame area. In other words, if the page to be printed is split into a plurality of frame areas, the print conditions can be respectively set for each of the plurality of frame areas.

For example, when information about each frame is received from an application program, it is possible to perform this process of splitting the page to be printed by specifying upper left coordinates and lower right coordinates of each frame area based on the received information.

(2-3) Print Condition Setting Process

The print condition setting process is a process in which the print conditions are automatically set to each area according to a previously set setting rule. Such process is described here using the following example of a setting rule: a "print condition set on the above-described print setting screen is set to the middle-level area, and a print condition previously designated by the user on a per-area print setting screen (see FIG. 4) (which will be described later) is set to the upper-level area and lower-level area."

Figure 4:
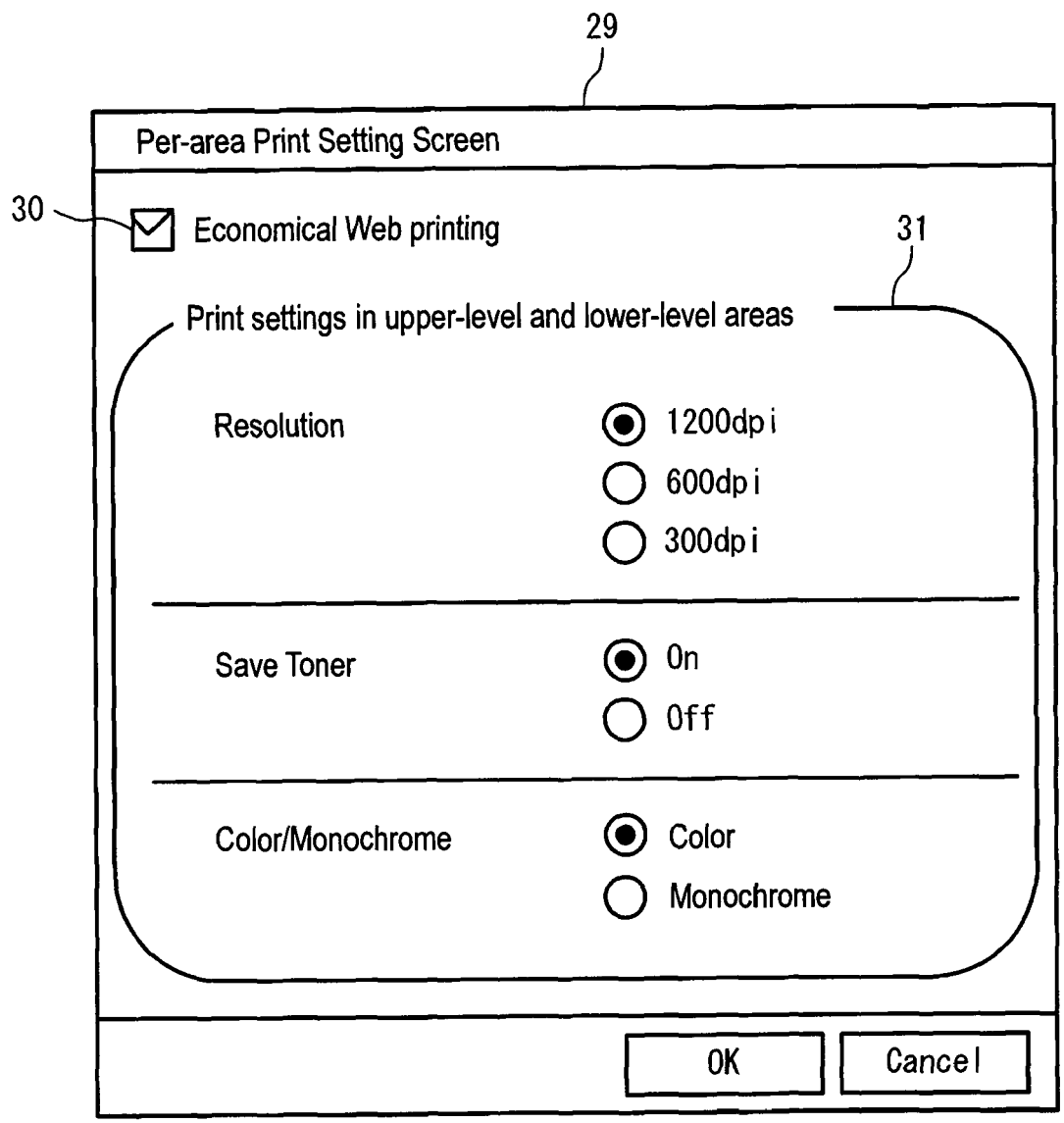
FIG. 4 is a pattern diagram of a per-area print setting screen according to the first exemplary embodiment of the invention.

FIG. 4 is an example of a per-area print setting screen 29. The per-area print setting screen 29 is displayed when the user clicks a predetermined button such as a "Detailed settings" button on the above-described print setting screen, for example.

An "economical Web printing" 30 shown in FIG. 4 is a check box for the user to select: whether to execute a split printing in which the printing is carried out so that the page to be printed is split and the print conditions are individually set to each split part; or whether to execute a whole printing in which the printing is carried out so that the same print condition is set to the whole page to be printed.

If the "economical Web printing" 30 is checked, the split printing is executed, and according to the above-described setting rules, the print conditions are set to each area. In contrast, if the checkbox is not checked, the whole printing is executed. The print condition set on the above-described print setting screen is applied to the whole page to be printed.

For example, if the upper-level area and the lower-level area contain important information for the user as does the middle-level area, and thus it is not desired to print the upper-level area and the lower-level area under the print conditions that have been set in accordance with the setting rules, the whole printing may be selected in order to carry out the printing under the desired print condition set on the print setting screen.

A "print settings in the upper-level area and lower-level area" 31 is a column for the user to previously designate the print conditions automatically set to the upper-level area and the lower-level area. With the "print settings in the upper-level and lower-level areas" 31, setting values for setting items such as "resolution," "save toner" and "color/monochrome" can be designated, as illustrated in the figure. These setting values are print conditions that affect a usage amount of toner used for printing.

According to the "resolution," print resolution can be set to 300 dpi (dot per inch), 600 dpi or 1200 dpi. The number of dots per inch for 300 dpi is smaller than that for 600 dpi. Thus, when the resolution is set to 300 dpi, the usage amount of toner used for printing can be made smaller than that for 600 dpi. Likewise, the usage amount of toner used for printing for 600 dpi is smaller than that for 1200 dpi.

According to "save toner", it is possible to set ON/OFF a process for reducing the usage amount of toner. The printer 11 does not necessarily form one pixel with one dot but forms one pixel with a plurality of dots. If the "save toner" is set to ON, the number of dots for one pixel becomes small, and thus the usage amount of toner used for printing can become small.

According to the "color/monochrome", it is possible to set color printing or monochrome printing. The number of dots to be formed does not change even if the printing is carried out either by color or by monochrome. Thus, it may seem that the setting value of "color/monochrome" does not affect the overall usage amount of toner. However, in terms of toner for each color, the usage amount is affected. For example, if the color printing is carried out by selecting "color," the usage amount of toner of C (cyan) becomes large and the usage amount of toner of K (black) becomes small. On the contrary, if the monochrome printing is carried out by selecting "monochrome", the usage amount of toner of C (cyan) becomes small and the usage amount of toner of K (black) becomes large. Therefore, it can be said that the setting value of "color/monochrome" is a print condition that affects the usage amount of toner.

As described above, if the previously designated print conditions are automatically set to the upper-level area and the lower-level area, the user becomes able to omit a task of setting the print conditions to the upper-level area and the lower-level area in a case of the split printing. Therefore, usability can be improved.

Incidentally, the print conditions that affect the usage amount of the toner used for printing are not limited to those described above. For example, the print conditions may include a setting value of a setting item for setting whether to print in a normal size or a reduced size for each of the areas. A reduced print can be carried out with a smaller amount of toner as compared to the normal print. Therefore, it can be said that the reduced print is a print condition which affects the usage amount of the toner used for printing.

Further, the previously designated print condition may also be set automatically to the middle-level area.

The above-described first exemplary embodiment has been described by using an example of the case where the Web page is split by the frame into three levels, i.e., the upper level, the middle level, and the lower level. Alternatively, there may be a case where the Web page is split by the frame into two levels (i.e., the upper level and the lower level), and the upper level is the advertisement and the lower level is the main text. In this case, by automatically setting the print condition under which the usage amount of toner is small to the upper-level area, the user is able to omit a task of setting the print condition under which the usage amount of toner is small to the upper-level area when the user desires to print such a Web page. That is, the setting rule can be set appropriately as required.

Further, it may be possible to configure such that a print condition under which the usage amount of toner is large cannot be designated in the per-area print setting screen 29. For example, in terms of the resolution, the per-area print setting screen may be displayed by deleting the setting value (1200 dpi), which is the largest usage amount of toner, from the options.

(2-4) Rotating Process

The rotating process is a process for rotating the page to be printed by 90 degrees to either left or right, if the page to be printed is split in a main scanning direction of the printer 11.

Figure 5:
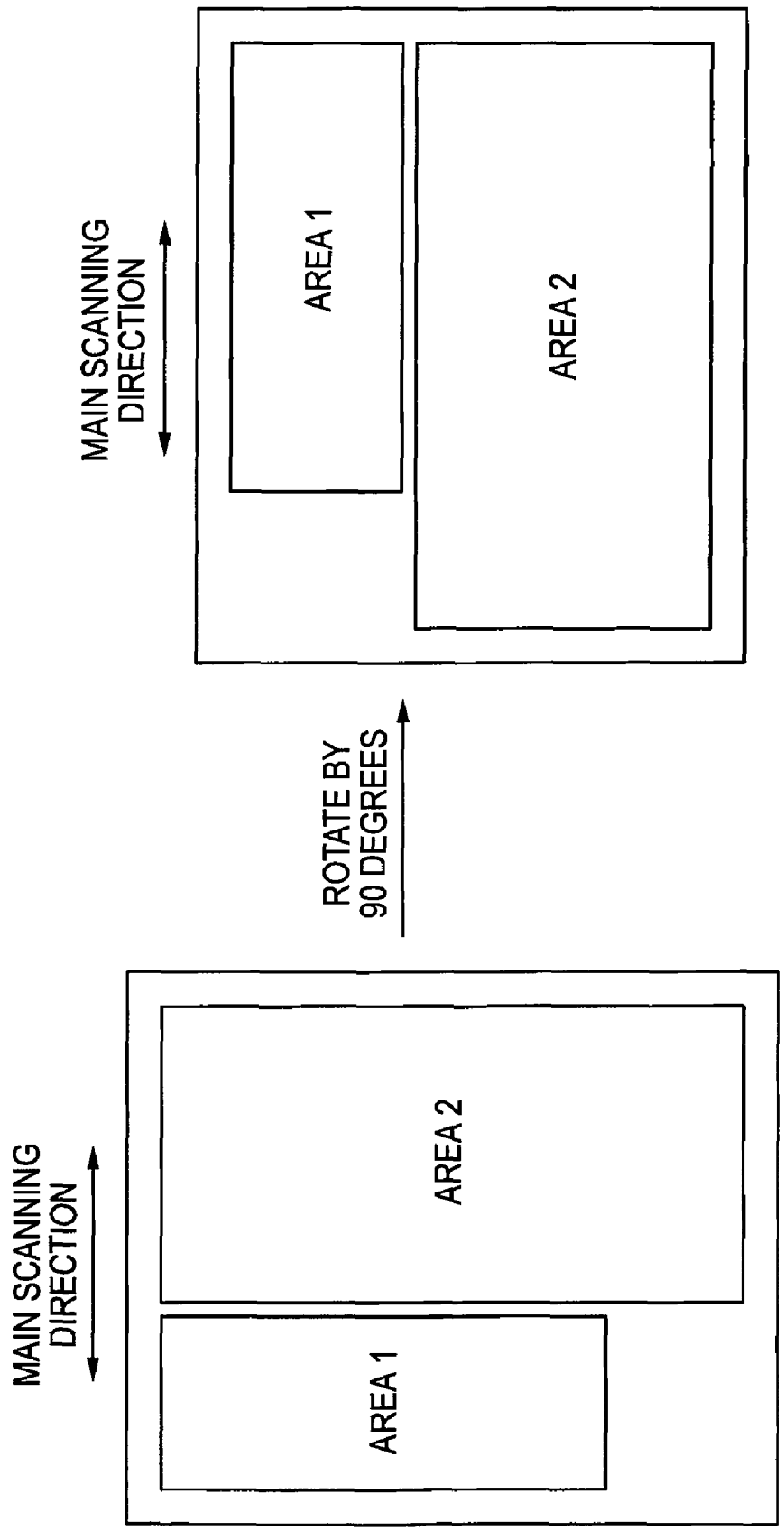
FIG. 5 is a pattern diagram for describing a rotating process according to the first exemplary embodiment of the invention.

FIG. 5 is a pattern diagram for describing the rotating process. Herein, the main scanning direction of the printer 11 is a direction in which a laser beam moves in a case of a laser printer in which the laser beam is polarized by a polygon mirror. Incidentally, the main scanning direction of the printer 11 is a direction in which LEDs are aligned in a case of a laser printer in which a photosensitive member is exposed using an LED beam. In a case of an inkjet printer, for example, the main scanning direction is a direction in which a print head for discharging ink is moved.

If the page to be printed is split in the main scanning direction of the printer 11, a print condition is changed while one line of a page to be printed is being formed in the recording medium. Therefore, the printing process becomes complicated. For example, if the resolution varies in the middle of one line, the control needs to be switched according to the resolution in the middle of one line. Thus, the printing process becomes complicated. On the other hand, if the page to be printed is rotated by 90 degrees, the page to be printed is not split in the main scanning direction. As a result, the print condition does not change in the middle of one line and the printing process becomes simplified. Therefore, if the page to be printed is split in a main scanning direction of the printer 11, it is preferable to execute the rotating process.

(2-5) Print Data Generating Process

The print data generating process is a process for generating a print data the page to be printed based on the print conditions set to each area.

Figure 6:
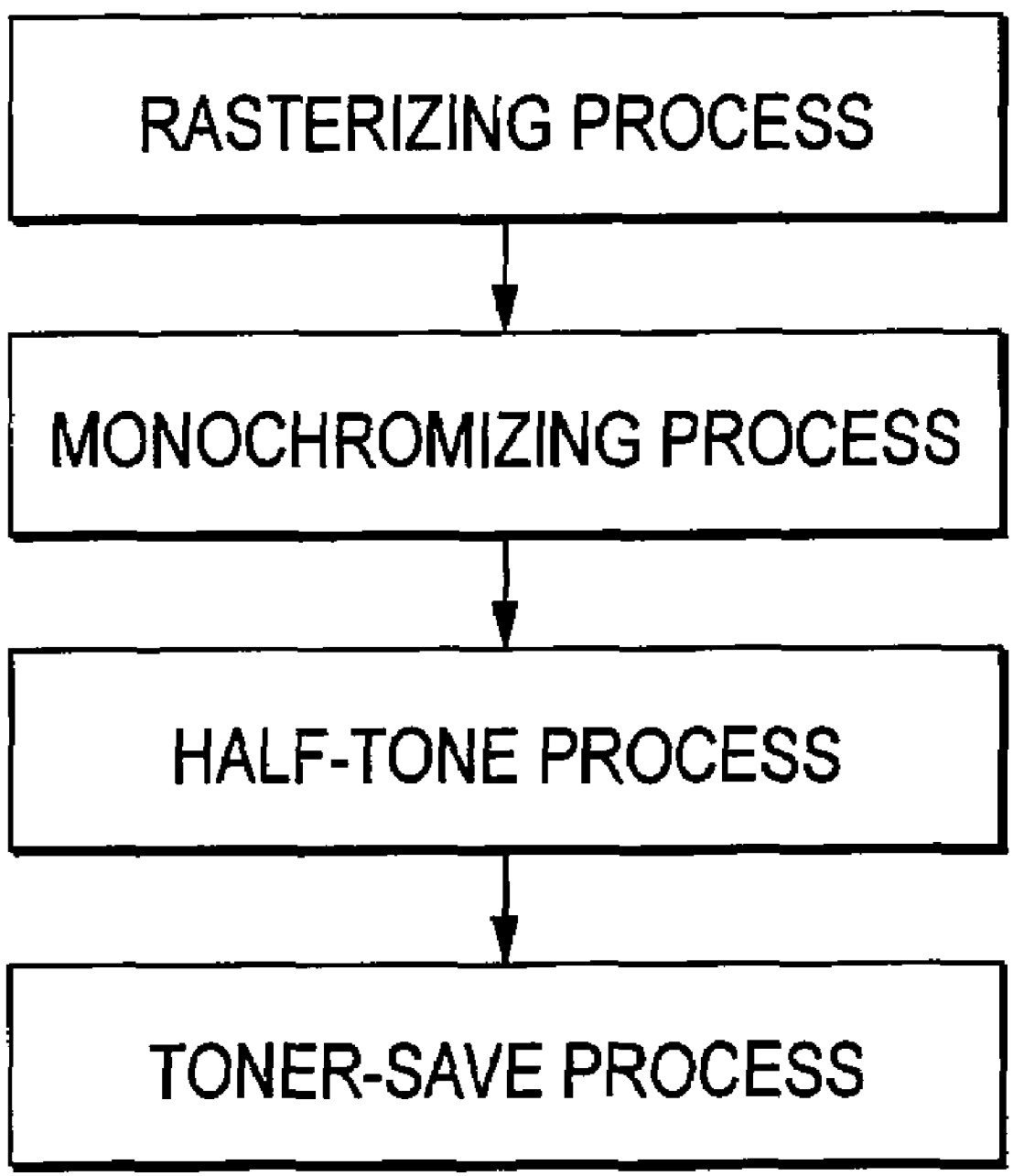
FIG. 6 is a pattern diagram showing a print data generating process according to the first exemplary embodiment of the invention.

FIG. 6 is a pattern diagram showing various processes executed during the print data generating process. In the print data generating process, processes such as a rasterizing process, a monochromizing process, a half-tone process, and a toner-save process are executed.

The rasterizing process is a process for converting data to be printed into color image data (raster data) having three pixel values, i.e., R (Red), G (Green), and B (Blue), for each pixel. In addition, the rasterizing process can also be executed on the application program side.

When the image data is generated by the rasterizing process, the printer driver specifies, with respect to each frame area described above, coordinates on the image data corresponding to the upper left coordinates and the lower right coordinates, respectively, of the frame area. Therefore, the area on the image data corresponding to each frame area can be specified.

The monochromizing process is a process for converting the color image data represented by the three colors of RGB into monochrome image data represented by three colors of RGB. The monochrome image data expressed in an RGB color space is said to be an image in which the R, G and B are equal in value with respect to one another. The monochromizing process is a process for rendering the pixel value of each color equal for each pixel. For a method for converting the color pixels (R, G, and B) into monochrome pixels (R', G', and B'), a method in which the image data is converted from an RGB color space into a YUV color space, and the Y (luminance) component is used as pixel values of R', G', and B' may be used, for example (please see following expressions).

$$Y = 0.299 \times R + 0.587 \times G + 0.114 \times B$$

$$R' = G' = B' = Y$$

Incidentally, the monochromizing process is executed for only areas where monochrome is set as the setting value of "color/monochrome." The process is not executed for areas where "color" is set.

The half-tone process is a process for converting image data represented by three colors of RGB into half-tone data (print data), which is a dot pattern of the printer 11, by a dither method or an error diffusion method. For example, if the printer 11 includes four color toners, i.e., C (Cyan), M (Magenta), Y (Yellow), and K (Black), the image data is converted into half-tone data of four colors, i.e., C, M, Y, and K.

Figure 7:
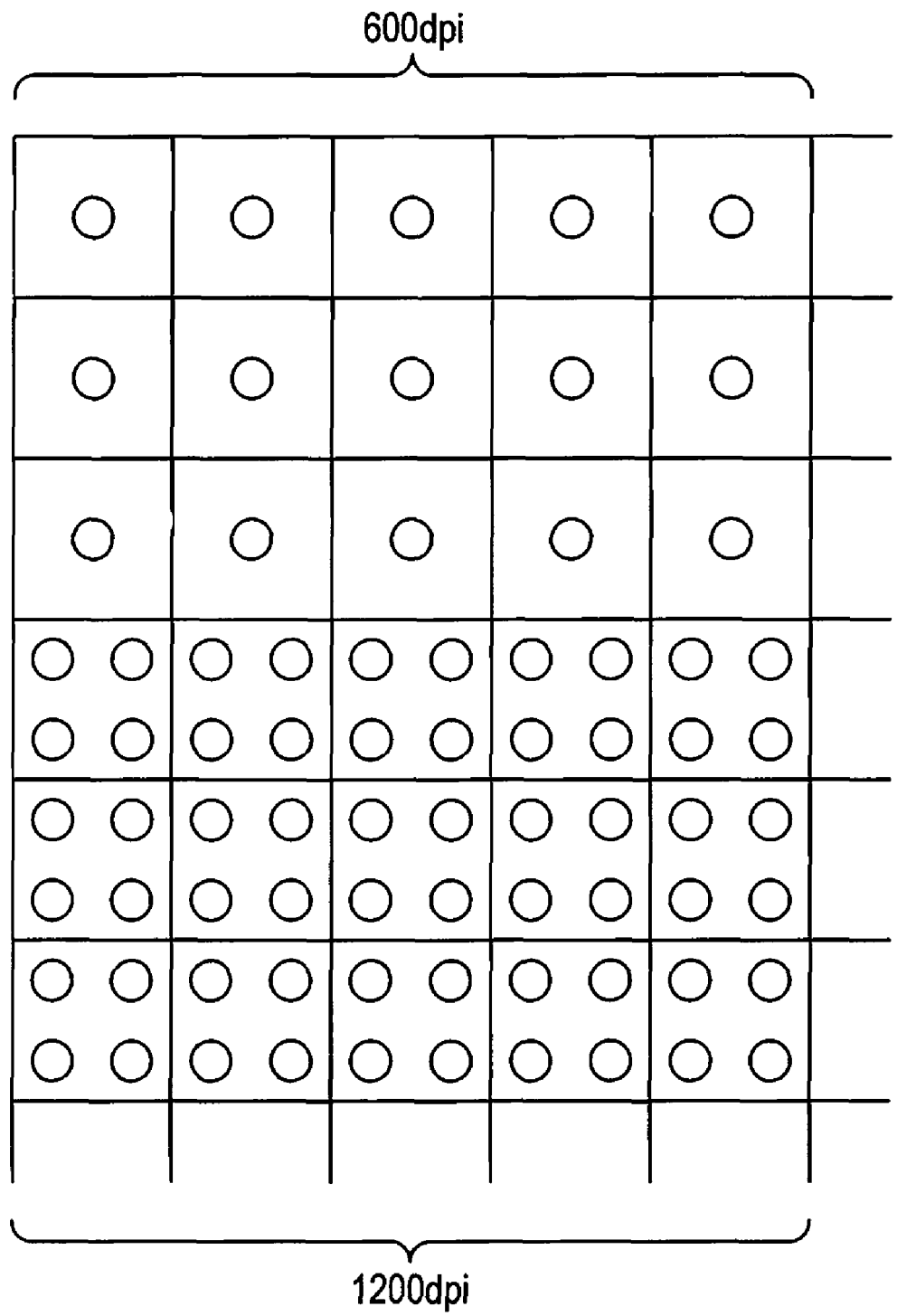
FIG. 7 is a pattern diagram of print data according to the first exemplary embodiment of the invention.

FIG. 7 is a pattern diagram for conceptually describing the half-tone data according to the first exemplary embodiment. In the half-tone process according to the first exemplary embodiment, the half-tone data is generated such that in an area in which a low resolution is set to the image data, the number of dots formed per same unit area is smaller as compared to an area in which a high resolution is set. For example, the half-tone data is generated such that in an area in which a 600-dpi resolution is set, the number of dots formed per same unit area is $1/4^{th}$ that of the dots formed in an area in which a 1200-dpi resolution is set. Therefore, the page to be printed is printed with different resolutions for each of the areas.

In addition, in the first exemplary embodiment, although the half-tone data is described as the print data, the print data may be described in a page description language (PDL) unique to the printer 11. In this case, the printer 11 will interpret the data so as to generate the half-tone data.

The toner-save process is a process executed together with the half-tone process, and is a process for reducing the usage amount of toner by generating the half-tone data such that the number of dots to be formed is smaller. For example, when the toner save is turned on, the number of dots to be formed is halved as compared to a case where the toner save is turned off. Therefore, it becomes possible to roughly reduce the usage amount of toner by half. However, since the usage amount of toner is reduced by half, the color of printed matter will be lighter.

(3) Operation of Image Forming System

Figure 8:
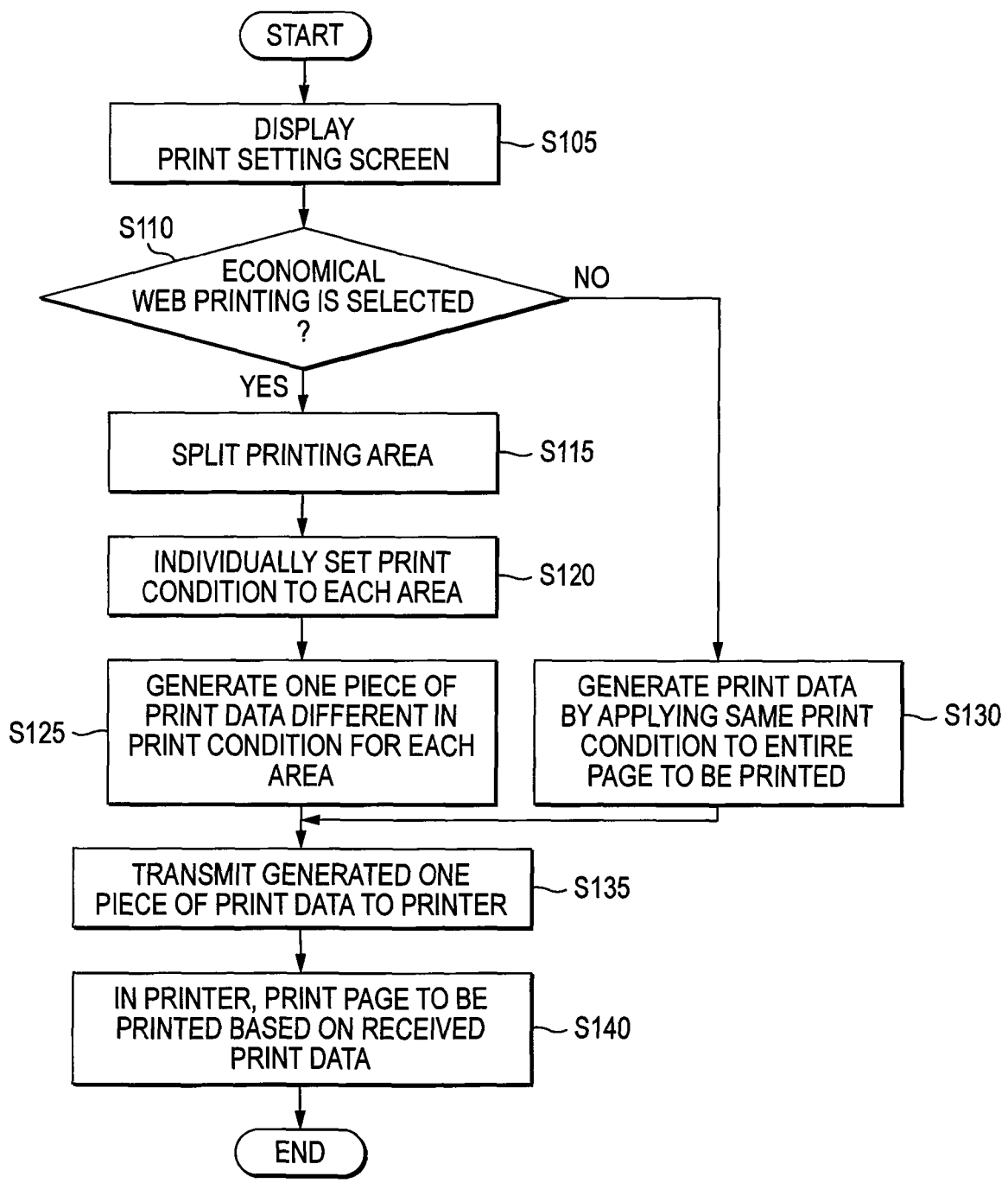
FIG. 8 is a flowchart according to the first exemplary embodiment of the invention.

FIG. 8 is a flowchart for describing a process of the image forming system 1. When the user gives a printing instruction by an application program, the process of the image forming system 1 is started.

At S105, the computer 10 displays the print setting screen.

At S110, the computer 10 judges whether or not the "economical Web printing" is selected. If the "economical Web printing" is selected, the computer 10 proceeds to S115. If the "economical Web printing" is not selected, the computer 10 proceeds to S130.

At S115, the computer 10 splits the page to be printed into a plurality of areas according to the previously set splitting rule.

At S120, the computer 10 automatically sets the print conditions individually to each area according to the previously set setting rules.

At S125, based on the print condition set to each area, the computer 10 generates one piece of print data (half-tone data) which differs in print condition depending on each area, for each color.

At S130, the computer 10 applies the print condition set on the print setting screen to the whole page to be printed so as to generate one half-tone data for each color.

At S135, the computer 10 transmits the generated half-tone data to the printer 11.

At S140, the printer 11 prints the page to be printed on the recording medium based on the half-tone data received from the computer 10.

Figure 9:
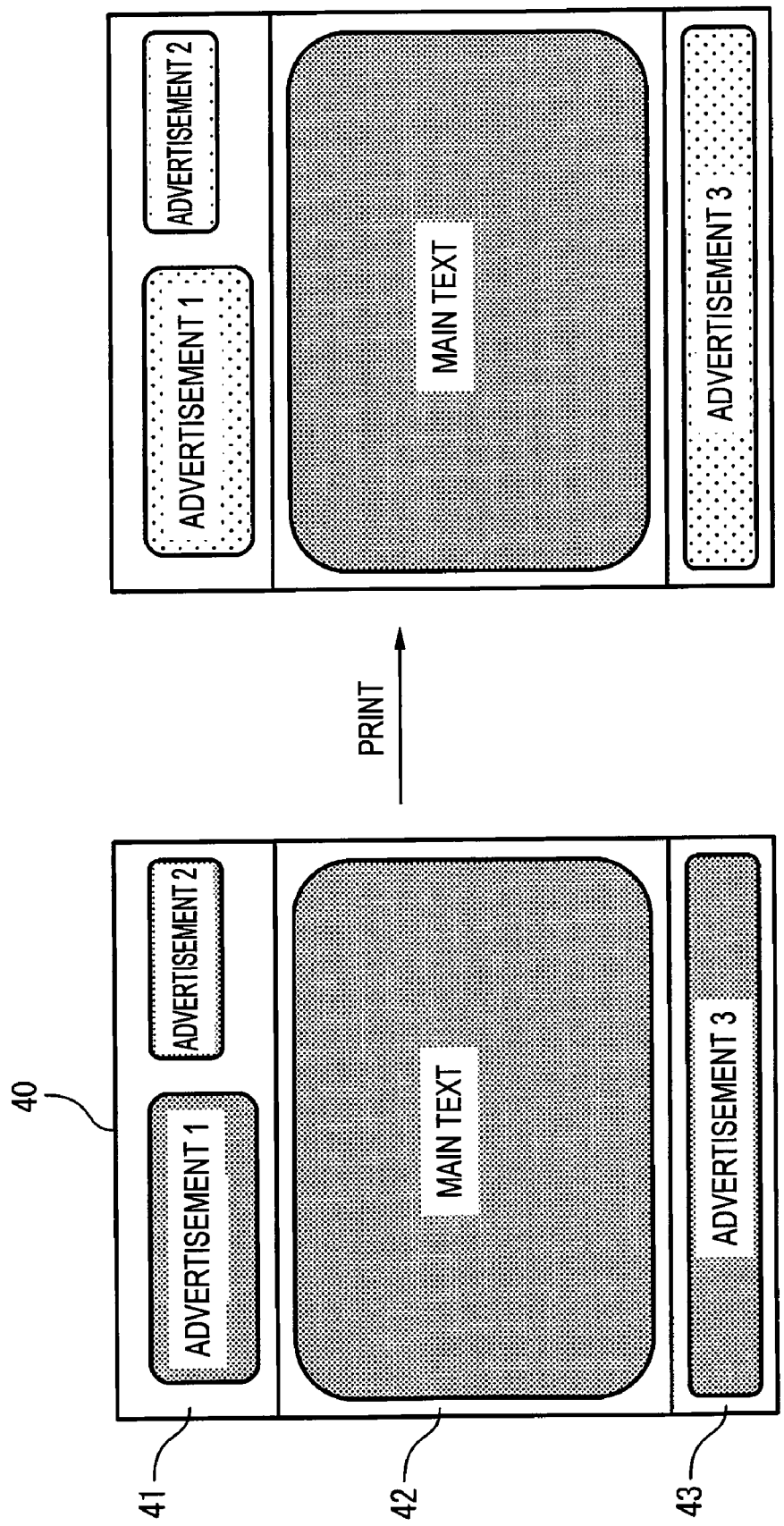
FIG. 9 is a pattern diagram of a printing result according to the first exemplary embodiment of the invention.

FIG. 9 is a pattern diagram showing the page to be printed 40 and a printing result thereof. In the illustrated example, to the upper-level frame area 41 including an advertisement 1 and an advertisement 2 and the lower-level frame area 43 including an advertisement 3, a print condition under which the usage amount of toner is small is set. The upper-level frame area 41 and the lower-level frame area 43 are printed light as shown in FIG. 9. In contrast, a print condition under which the usage amount of toner is large is set to the middle-level frame area 42 including the main text. The middle-level frame area 42 is printed dark as illustrated in FIG. 9.

According to the above-described image forming system 1 of the first exemplary embodiment of the invention, the waste of color materials at the time of printing the page to be printed can be reduced by individually setting the print conditions to the respective frame areas.

Second Exemplary Embodiment

Next, a second exemplary embodiment of the invention will be described with reference to FIG. 10.

In the first exemplary embodiment, the print conditions are automatically set to each split area. Alternatively, in the second exemplary embodiment, the print conditions are manually set to each split area by the user.

Figure 10:
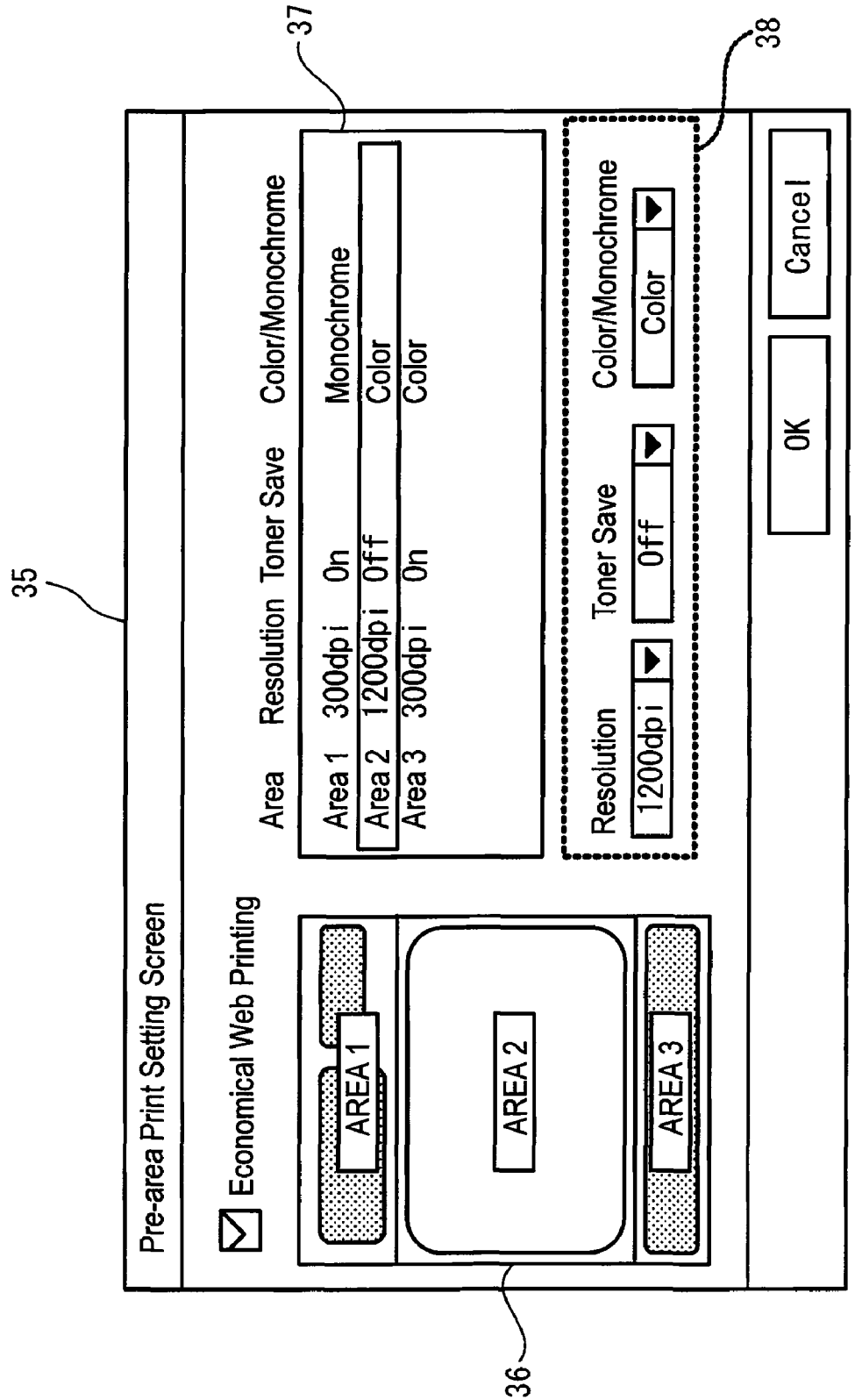
FIG. 10 is a pattern diagram of a per-area print setting screen according to a second exemplary embodiment of the invention.

FIG. 10 is a pattern diagram showing an example of a per-area print setting screen 35 for the user to manually set the print conditions to each split area.

An area displaying column 36 is a column for guiding the user how the page to be printed is split. Area names, which are different from one another, are automatically imparted to each split area and are displayed.

A per-area print condition column 37 is a column for displaying the print condition set to each split area. Each row of a print-condition displaying column 37 corresponds to respective split areas. The user is able to select at least one of the split areas by clicking on the row in the print condition column 37 or the area on the area displaying column 36 with a mouse. In the second exemplary embodiment, the print conditions set through the print setting screen described in the first exemplary embodiment are displayed as default value.

A print-condition selecting column 38 is a column for setting the print conditions that affects the usage amount of toner to an area corresponding to a row in which a cursor is located in the per-area print condition column 37.

According to the second exemplary embodiment, the user can select an area to which the print condition under which the usage amount of toner is small is set. Thus, the user is able to reliably set the print condition under which the usage amount of toner is small to an area in which the user desires to set the print condition under which the usage amount of toner is small.

Third Exemplary Embodiment

A third exemplary embodiment of the invention will be described with reference to FIG. 11.

In the third exemplary embodiment, the page to be printed is not printed as it is. Alternatively, the page is printed on different recorded media for each of the areas.

Figure 11:
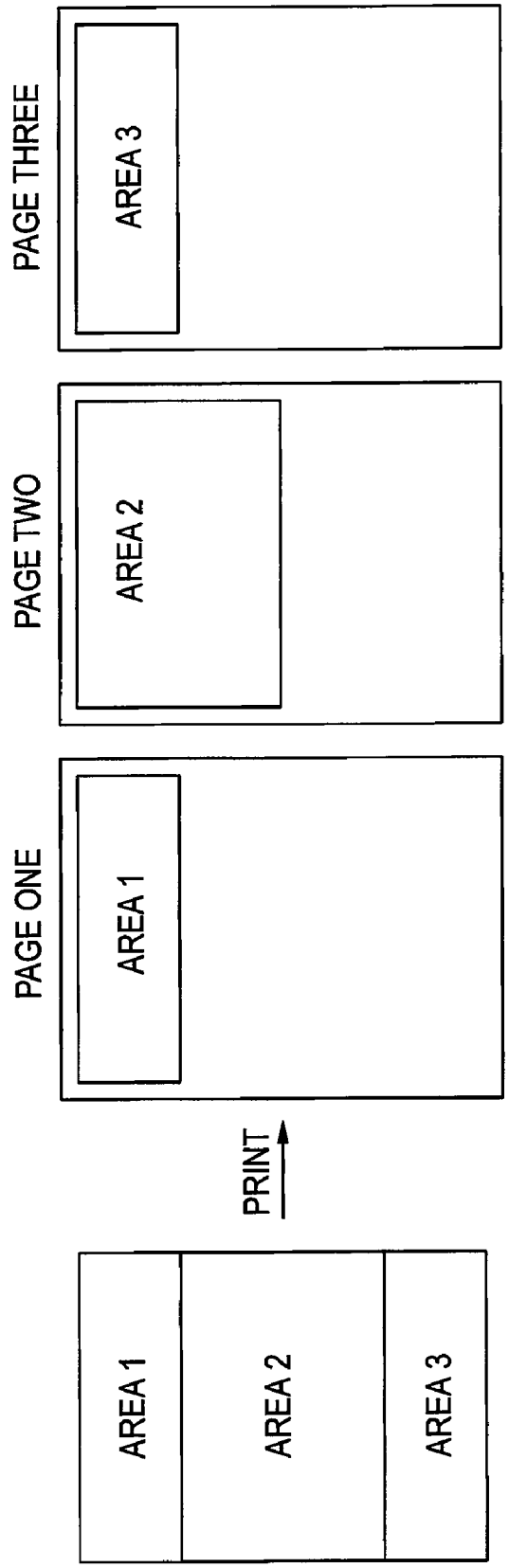
FIG. 11 is a pattern diagram of a printing result according to a third exemplary embodiment of the invention.

FIG. 11 is a pattern diagram showing an example in which the page to be printed is printed on the different recorded media for each of the areas. In the illustrated example shown in FIG. 11, the page to be printed is split into three areas, and the split three areas are printed on recorded media different from one another.

According to the third exemplary embodiment, it is possible to browse by dividing the page into an important area and a non-important area for the user. Therefore, it is possible to improve the usability in a case when the user desires to browse the page by dividing the page into the important area and the non-important area.

In the third exemplary embodiment, a case where each area is printed on the different recorded media is described. Alternatively, for example, when the area 1 and the area 3 are those in which the print condition under which the usage amount of toner is small is set and the area 2 is that in which a print condition under which the usage amount of toner is relatively large is set, the area 1 and the area 3 may be printed on the same recording medium and the area 2 may be printed on the different recording medium. Accordingly, the waste of the recording medium can be reduced.

Fourth Exemplary Embodiment

A fourth exemplary embodiment of the invention will be described with reference to FIG. 12 and FIG. 13.

In the fourth exemplary embodiment, the half-tone data (one example of per-area print data, hereinafter referred to as a "per-area half-tone data") is generated individually for each of the areas, and also, area information for specifying each area on the page to be printed is generated. One print file in which each per-area half-tone data and the area information are housed is transmitted to the printer 11 as the print data.

Figure 12:
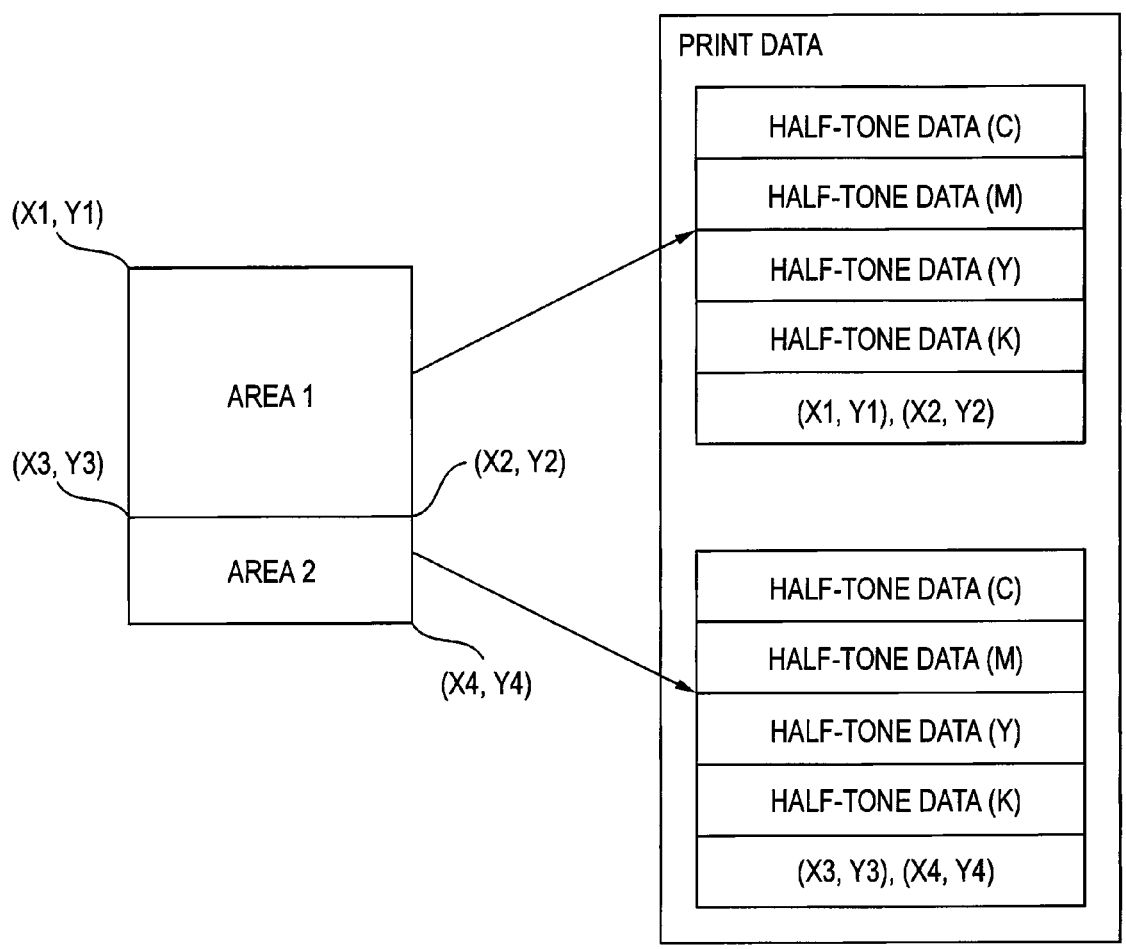
FIG. 12 is a pattern diagram of print data according to a fourth exemplary embodiment of the invention.

FIG. 12 is a pattern diagram conceptually showing the print file. The half-tone data is practically the same as that in the first exemplary embodiment except for being generated on an area-to-area basis. As the area information, upper left coordinates (X1, Y1) and lower right coordinates (X2, Y2) of each area when the page to be printed is split in a plurality of areas may be used. When the upper left coordinates (X1, Y1) and the lower right coordinates (X2, Y2) are transmitted to the printer 11 as the area information, the printer 11 determines the print area of the each per-area half-tone data on the recording medium, based on the upper left coordinates (X1, Y1) and the lower right coordinates (X2, Y2) coordinates. When each of the per-area half-tone data is printed in the determined print area, the page to be printed can be printed on the recording medium.

Figure 13:
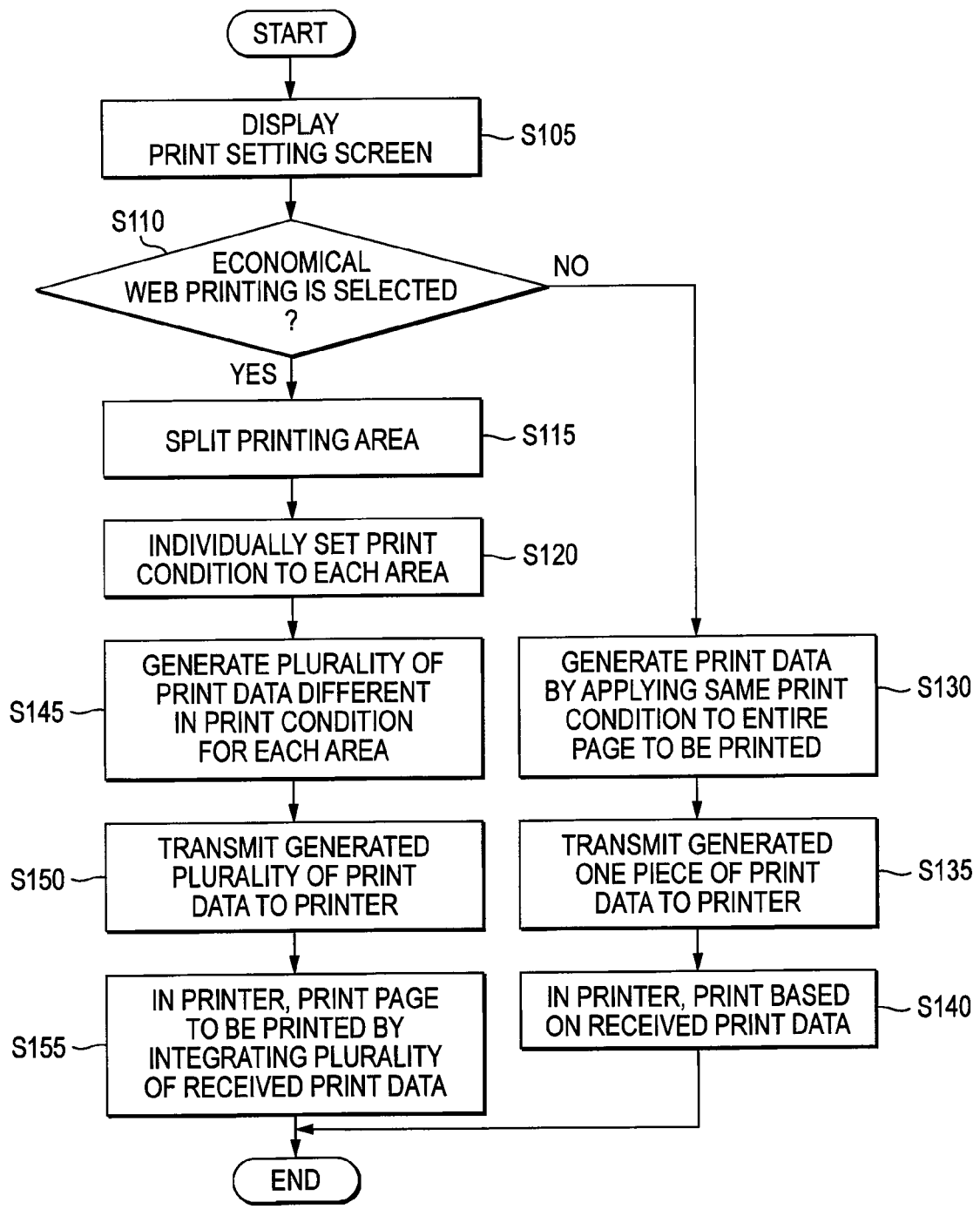
FIG. 13 is a flowchart according to the fourth exemplary embodiment of the invention.

FIG. 13 is a flowchart for describing a process of the image forming system according to the fourth exemplary embodiment. In this case, processes practically the same as those in the first exemplary embodiment are assigned the same reference numerals, and the explanations thereof are omitted.

At S145, the computer 10 generates the per-area half-tone data for each area based on the print conditions set to each area. In addition, the computer 10 generates the area information for specifying each area on the page to be printed.

At S150, the computer 10 transmits one print file in which each per-area half-tone data and the area information are housed, to the printer 11.

At S155, the printer 11 determines the print area on the recording medium on which each per-area half-tone data should be printed based on the area information, and forms the per-area half-tone data in the determined print area.

As described above, when the printer 11 is caused to print the page to be printed in which the print conditions are individually set to each area, a plurality of per-area half-tone data and area information may be transmitted to the printer 11 and the print area on the recording medium to be printed by the printer 11 may be determined and printed.

Fifth Exemplary Embodiment

A fifth exemplary embodiment of the invention will be described with reference to FIG. 14.

In the fifth exemplary embodiment, the area information for specifying each area on the page to be printed is generated. The page to be printed, the area information, and the print conditions set to each area are transmitted, as the print data, to the printer 11.

Figure 14:
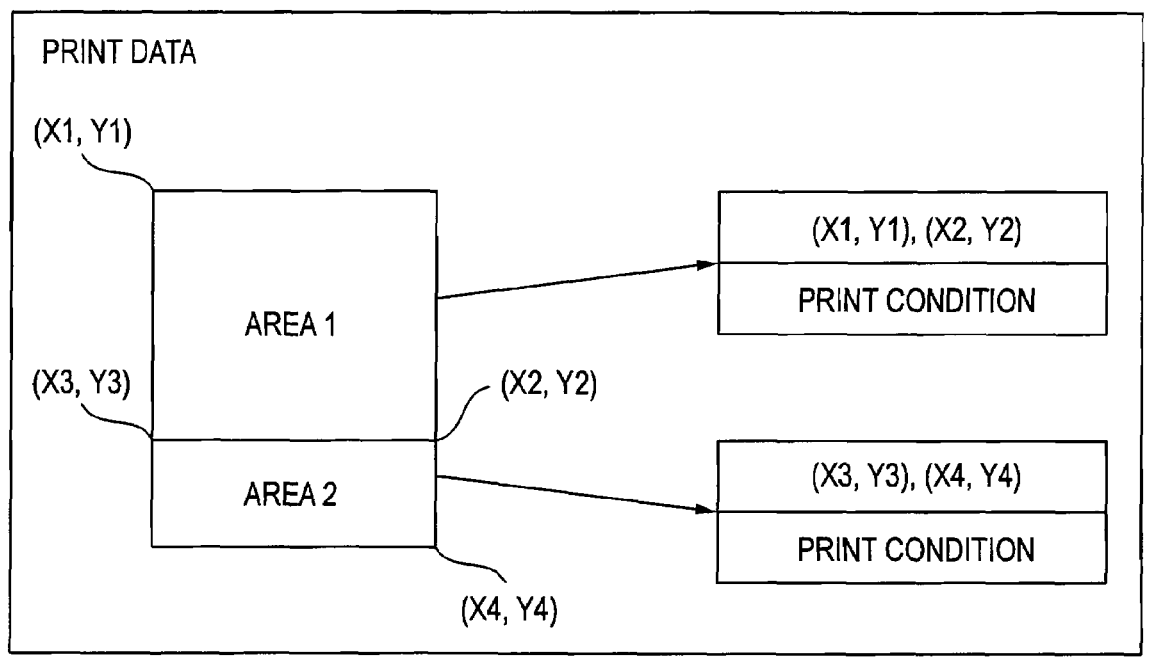
FIG. 14 is a pattern diagram of print data according to a fifth exemplary embodiment of the invention.

FIG. 14 is a pattern diagram conceptually showing the page to be printed, the area information, and the print conditions set to each area.

The printer 11 generates the half-tone data based on the print conditions set to each area, and based on the generated half-tone data, prints the page to be printed on the recording medium.

As described above, when the printer 11 is caused to print the page to be printed in which the print conditions are individually set to each area, the page to be printed, the area information, and the print conditions may be transmitted to the printer 11 so as to generate the half-tone data by the printer 11 and carry out the printing.

Sixth Exemplary Embodiment

A sixth exemplary embodiment of the invention will be described with reference to FIG. 15.

In the sixth exemplary embodiment, a plurality of area data obtained by separating the page to be printed into each area are generated. The plurality of area data and print conditions set to each area are transmitted, as the print data, to the printer 11.

Figure 15:
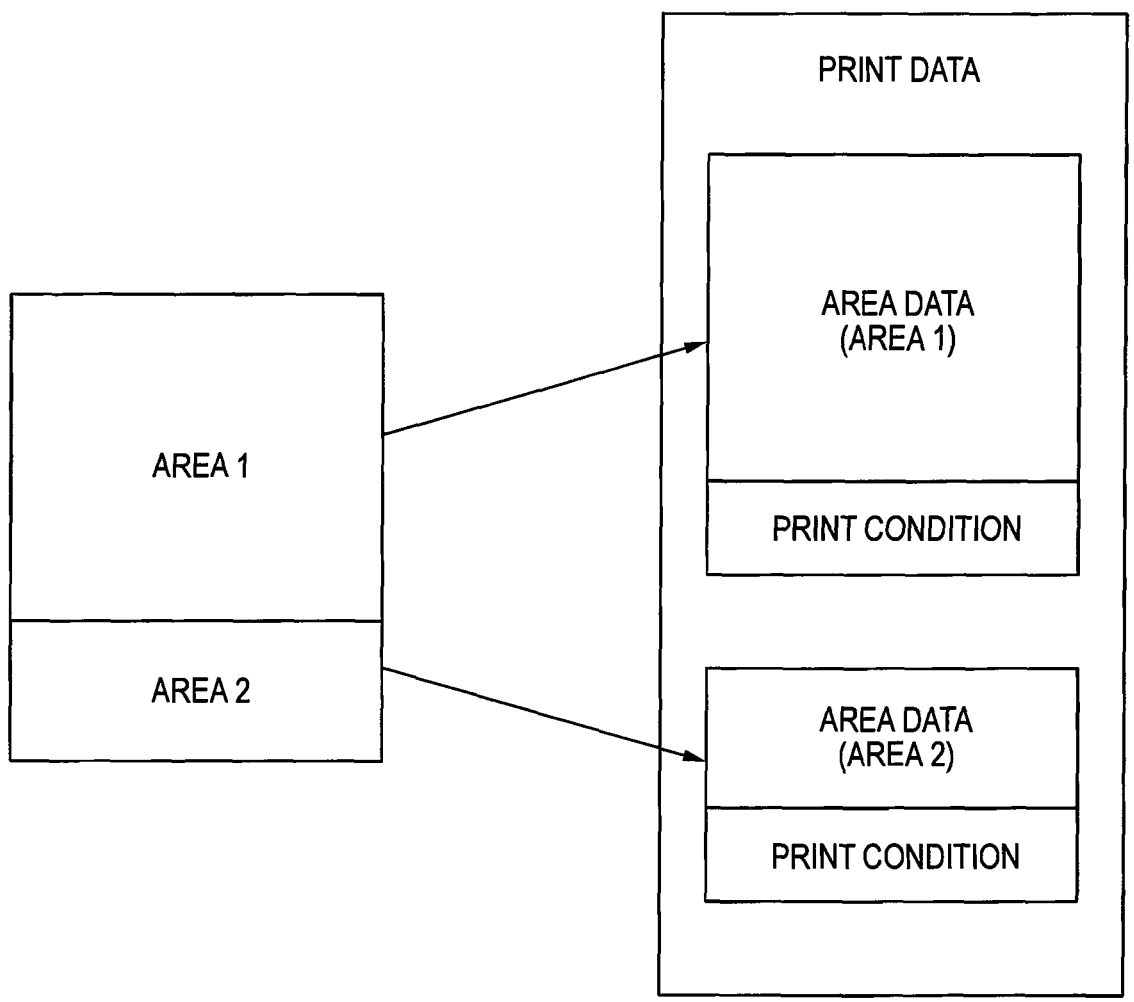
FIG. 15 is a pattern diagram of print data according to a sixth exemplary embodiment of the invention.

FIG. 15 is a pattern diagram conceptually showing the page to be printed, the plurality of area data obtained by separating the page to be printed into each area, and the print conditions set to each area.

For each of the area data, the printer 11 generates the half-tone data based on a print condition corresponding to the area data, and prints each area on different recorded media based on each of the generated half-tone data.

As described above, when the printer 11 is caused to print the page to be printed in which the print conditions are individually set to each area, the plurality of area data separated into each area and the print conditions set to each area may be transmitted to the printer 11 so as to generate the half-tone data by the printer 11 and carry out the printing.

Moreover, according to the sixth exemplary embodiment, the page to be printed is separated into a plurality of area data, which are respectively printed on the different recorded media. Thus, even with a printer not compatible with the printing of the page to be printed in which the print conditions different for each area are set, the printing may be carried out.

Seventh Exemplary Embodiment

A seventh exemplary embodiment of the invention will be described.

In the seventh exemplary embodiment, the print condition in each area is not set on the computer 10 side but set on the printer 11 side. In the seventh exemplary embodiment, the computer 10 generates the area information for specifying each area on the page to be printed, and transmits the page to be printed and the area information, as the print data, to the printer 11.

First, the printer 11 sets the print conditions to each area specified by the area information according to the previously set setting rules. In addition, it may be configured so that the user operates the operating part 23 of the printer 11 so as to manually set the print conditions to each area rather than setting the print conditions according to the previously set setting rules.

Next, the printer 11 generates the half-tone data based on the print conditions set to each area, and prints the page to be printed on the recording medium based on the generated half-tone data.

As described above, when the print conditions are set to each area on the printer 11 side and the printing is carried out, the page to be printed and the area information may be transmitted to the printer 11 so as to carry out the printing.

Eighth Exemplary Embodiment

An eighth exemplary embodiment of the invention is described below.

Similar to the seventh exemplary embodiment, in the eighth exemplary embodiment, the setting of the print conditions to each area is carried out on the printer 11 side. In the eighth exemplary embodiment, a plurality of area data obtained by separating the page to be printed into each area is transmitted to the printer 11 as the print data.

First, the printer 11 sets the print conditions to each area data according to the previously set setting rules. Next, the printer 11 generates the half-tone data based on the print conditions corresponding to each area data, and prints each of the generated half-tone data in recorded media different from one another.

As described above, when the printing is carried out by setting the print conditions to each area on the printer 11 side, the plurality of area data obtained by separating the page to be printed into each area may be transmitted to the printer 11.

Other Exemplary Embodiments

The invention is not limited to the above-described exemplary embodiments. For example, various exemplary embodiments described below may also be included in the technical scope of the invention.

The above-described exemplary embodiments of the invention have been described in relation to a color laser printer which uses the toner as the color material. Alternatively, the invention may be applied to other printers. For example, the invention may also be applied to an inkjet printer.

In the above-described exemplary embodiments, the page to be printed is split into a plurality of areas on the computer side. Alternatively, the page to be printed may be split on the printer side.

In the above-described exemplary embodiments, the page to be printed is structured such that different Web pages are respectively displayed in a plurality of frame areas split by the frame is described as an example. Alternatively, the page to be printed may be a page in which non-text such as a photograph and illustration and text such as a character string are mixed.

Figure 16:
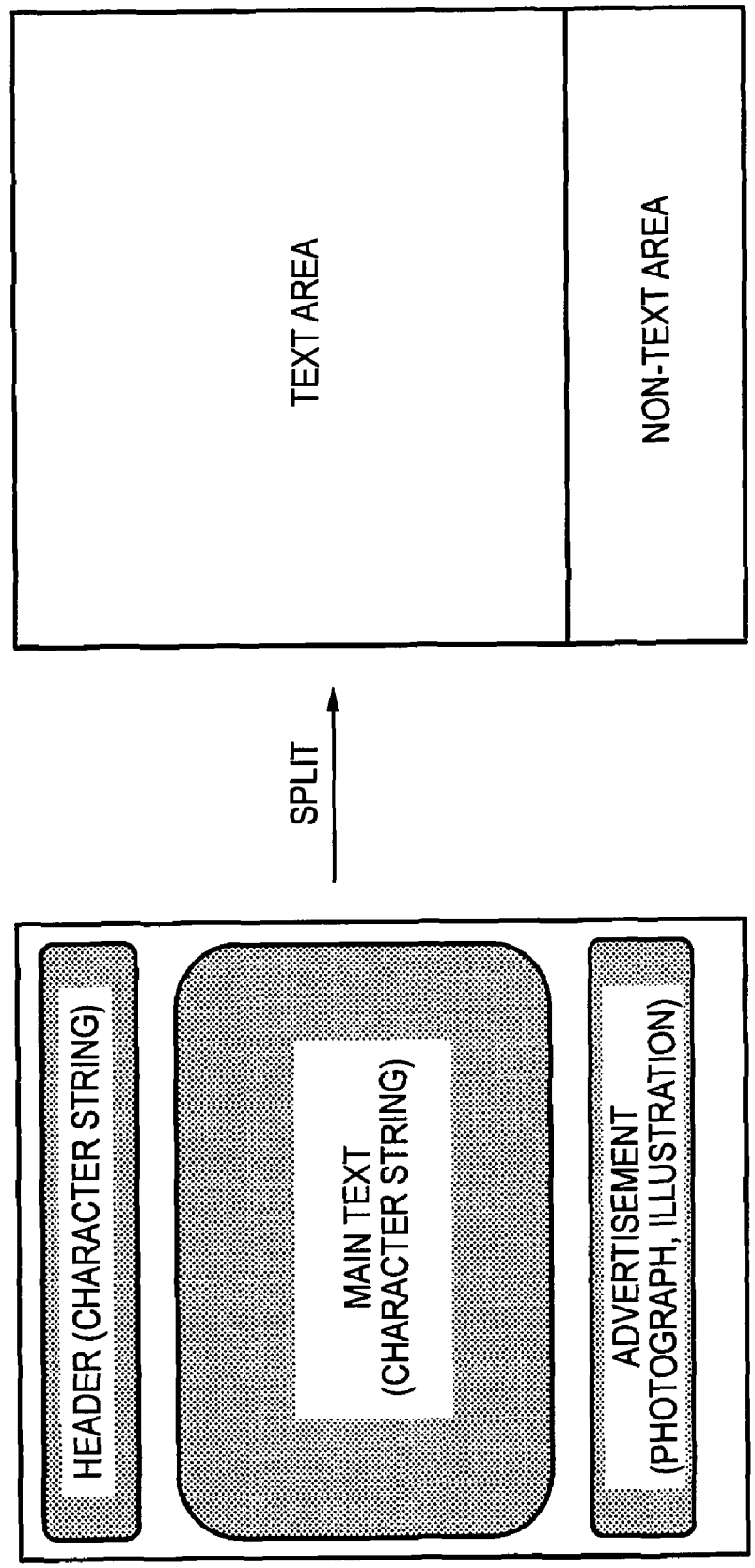
FIG. 16 is a pattern diagram showing an example of a splitting rule according to another exemplary embodiment of the invention.

FIG. 16 is a pattern diagram showing another example of the splitting rule. An illustrated page to be printed is, for example, an electronic mail document. In the page to be printed in this example, non-text data such as a photograph and an illustration and text data such as a character string are mixed within the electronic mail document. Such a page to be printed may be split into a text area including the text data and a non-text area including the non-text data. For example, when the non-text data is not important for the user, a print condition, under which the usage amount of toner is small, may be set for the non-text area so as to carry out the printing of the page to be printed. Therefore, it is possible to reduce the waste of the toner.

A process for splitting the image data into the text area and the non-text area may be carried out by performing a character recognizing process on image data, which is generated by a rasterizing process, by a printer driver so as to recognize the text area, and recognizing an area other than the recognized text area as the non-text area, for example. Alternatively, the process for splitting the image data into the text area and the non-text area may be carried out by splitting the page to be printed into the text area and the non-text area by an application program. Incidentally, when the page to be printed is split on the application program side, the application program and the printer driver correspond to a print program.

According to another aspect of the invention, in the image forming system, wherein the page to be printed includes a plurality of frame areas split by at least one frame, each of the plurality of frame areas displays respective Web pages, and wherein the splitting unit splits the page to be printed into the plurality of areas, each of the plurality of areas corresponding to respective frame areas.

According thereto, the waste of color materials at the time of printing a page to be printed can be reduced by respectively setting a print condition to each frame area.

According to still another aspect of the invention, in the image forming system, wherein the splitting unit splits the page to be printed into a text area and a non-text area if the page to be printed is a page in which text and non-text are mixed.

According thereto, the waste of color materials at the time of printing a page to be printed can be reduced by respectively setting print conditions to a text area and a non-text area.

According to still another aspect of the invention, in the image forming system, wherein the setting unit automatically sets the print condition to each of the plurality of areas according to a preset setting rule.

According thereto, since the print condition is set automatically according to a setting rule, the usability can be improved.

According to still another aspect of the invention, in the image forming system, wherein the setting unit comprises a designating unit that enables a user to designate a setting value of the preset setting rule.

According thereto, a user is able to designate a setting value automatically set to each area in advance.

According to still another aspect of the invention, in the image forming system, wherein the setting unit comprises a manual setting unit that enables a user to manually set the print condition to each of the plurality of areas.

According thereto, the user is able to manually set a print condition to each of the plurality of areas.

According to still another aspect of the invention, the image forming system further comprises: a selecting unit that selects one of a split printing and a whole printing, wherein, when the selecting unit selects the split printing, the splitting unit splits the page to be printed into the plurality of areas according to the preset splitting rule, and the setting unit respectively sets the print condition to the each of the plurality of areas, and wherein, when the selecting unit selects the whole printing, the setting unit sets the same print condition to a whole of the page to be printed.

According thereto, the user is able to select the split printing or the whole printing.

According to still another aspect of the invention, in the image forming system, wherein, if the page to be printed is split in a main scanning direction of the image forming apparatus, the printing unit rotates the page to be printed by 90 degrees and prints the rotated page to be printed.

Generally, when the print conditions differ depending on each main scanning direction, a printing process becomes complex. By virtue of this aspect, when a page to be printed is split in a main scanning direction of an image forming apparatus, the page to be printed is rotated by 90 degrees so as to carry out the printing. Thus, the printing process becomes simplified.

According to still another aspect of the invention, in the image forming system, the printing unit prints each of the plurality of areas on respective recording media.

According thereto, it is possible to print each area on different recorded media.

According to still another aspect of the invention, in The computer-readable medium having a print program, wherein the print data comprises per-area print data that is respectively generated for each of the plurality of areas based on the print condition.

When the image forming apparatus prints a page to be printed in which print conditions are individually set to each area, per-area print data may be generated and transmitted to the image forming apparatus as described above.

According to still another aspect of the invention, in the computer-readable medium having a print program, wherein the print data comprises: the page to be printed; area information for specifying the page to be printed; and the print condition.

When the image forming apparatus prints a page to be printed in which print conditions are individually set to each area, the page to be printed, area information for specifying each area, and a print condition may be transmitted to the image forming apparatus as described above.

According to still another aspect of the invention, in the computer-readable medium having a print program, wherein the print data comprises: a plurality of area data obtained by separating the page to be printed into each of the plurality of areas; and the print condition.

When an image forming apparatus prints a page to be printed in which print conditions are individually set to each area, a plurality of area data obtained by separating the page to be printed into each area and a print condition set to each area may be transmitted to the image forming apparatus as described above.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image forming system comprising:
   an information processing apparatus;
   an image forming apparatus that is connected to the information processing apparatus so as to communicate with the information processing apparatus;
   one or more processors;

memory having computer readable instructions stored thereon that, when executed by the one or more processors, cause the one or more processors to:
split a page to be printed into a plurality of areas according to a preset splitting rule;
individually set a print condition, which affects a usage amount of a color material used for printing, for each of the plurality of areas; and
print the page to be printed based on the print condition set for each of the plurality of areas,
wherein the print condition is at least one of print resolution, save toner, color, and monochrome.

2. The image forming system according to claim 1,
wherein the page to be printed includes a plurality of frame areas split by at least one frame, each of the plurality of frame areas displaying respective Web pages, and
wherein each of the plurality of areas corresponds to respective frame areas.

3. The image forming system according to claim 1, wherein the computer readable instructions, when executed, cause the processor to split the page to be printed into a text area and a non-text area if the page to be printed is a page in which text and non-text are mixed.

4. The image forming system according to claim 1, wherein the computer readable instructions, when executed, cause the processor to automatically set the print condition to each of the plurality of areas according to a preset setting rule.

5. The image forming system according to claim 4, wherein the computer readable instructions, when executed, cause the processor to allow a user to designate a setting value of the preset setting rule.

6. The image forming system according to claim 1, wherein the computer readable instructions, when executed, cause the processor to allow a user to manually set the print condition for each of the plurality of areas.

7. The image forming system according to claim 1, wherein the computer readable instructions, when executed further cause the processor to:
select one of a split printing and a whole printing,
wherein, when the split printing is selected, the computer readable instructions, when executed, cause the processor to split the page to be printed into the plurality of areas according to the preset splitting rule, and respectively set the print condition for each of the plurality of areas, and
wherein, when the whole printing is selected, the computer readable instructions, when executed, cause the processor to set the same print condition to a whole of the page to be printed.

8. The image forming system according to claim 1, wherein, in the case that the page to be printed is split in a main scanning direction of the image forming apparatus, the computer readable instructions, when executed, cause the processor to rotate the page to be printed by 90 degrees and print the rotated page to be printed.

9. The image forming system according to claim 1, wherein the computer readable instructions, when executed, cause the processor to print each of the plurality of areas on respective recording media.

10. The image forming system according to claim 1, wherein after the page to be printed is split into the plurality of areas, the computer readable instructions, when executed, cause the one or more processors to individually associate the print condition with each of the plurality of areas.

11. The image forming system according to claim 1, wherein after the page to be printed is split into the plurality of areas, the computer readable instructions, when executed, cause the one or more processors to allow a user to input the print condition for each of the plurality of areas.

12. An image forming apparatus comprising:
a receiving unit that receives print data for respectively setting a print condition to each area of a page to be printed so as to carry out printing;
a processor configured to individually set a print condition, which affects a usage amount of a color material used for printing, for the each area of the page to be printed; and
an image forming unit that prints the page to be printed based on the print condition,
wherein the print condition is at least one of print resolution, save toner, color, and monochrome.

13. A non-transitory computer-readable medium having a print program stored thereon and readable by a computer connected to an image forming apparatus, the print program, when executed by the computer, cause the computer to perform operations comprising:
receiving a page displayed on a display for printing;
splitting the page to be printed into a plurality of areas according to a preset splitting rule;
individually setting a print condition, which affects a usage amount of a color material used for printing, for each of the plurality of areas;
generating print data that is used for printing the page to be printed based on the print condition set to each of the plurality of areas; and
transmitting the print data to the image forming apparatus,
wherein the print condition is at least one of print resolution, save toner, color, and monochrome.

14. The non-transitory computer-readable medium having a print program according to claim 13, wherein the print data comprises per-area print data that is individually generated for each of the plurality of areas based on the print condition.

15. The non-transitory computer-readable medium having a print program according to claim 13, wherein the print data comprises:
the page to be printed;
area information for specifying the page to be printed; and
the print condition.

16. The non-transitory computer-readable medium having a print program according to claim 13, wherein the print data comprises:
a plurality of area data obtained by separating the page to be printed into each of the plurality of areas; and
the print condition.

17. A non-transitory computer-readable medium having a print program stored thereon and readable by a computer connected to an image forming apparatus, the print program, when executed by the computer, causes the computer to perform operations comprising:
splitting a page to be printed into a plurality of areas according to a preset splitting rule; and
transmitting print data for individually setting a print condition to each of the areas for printing, to the image forming apparatus,
wherein the print condition is at least one of print resolution, save toner, color, and monochrome.

18. An image forming method comprising:
splitting a page to be printed into a plurality of areas according to a preset splitting rule;
individually setting a print condition, which affects a usage amount of a color material used for printing, for each of the plurality of areas; and
printing the page to be printed based on the print condition set for each of the plurality of areas, wherein the print condition is at least one of print resolution, save toner, color, and monochrome.

19. An image forming apparatus comprising:

a receiving unit that receives print data generated based on a page to be printed in which a plurality of areas are split and a print condition is respectively set to each of the plurality of areas, wherein the print condition is at least one of print resolution, save toner, color, and monochrome; and an image forming unit that prints the page to be printed based on print data.

* * * * *